(12) United States Patent
Horiuchi et al.

(10) Patent No.: US 6,594,003 B1
(45) Date of Patent: Jul. 15, 2003

(54) MEASURING SYSTEM OF TRANSMISSION CHARACTERISTICS

(75) Inventors: Yukio Horiuchi, Kamifukuoka (JP); Toshio Kawazawa, Tokyo (JP)

(73) Assignees: KDD Corporation, Tokyo (JP); KDD Submarine Cable Systems Inc., Tokyo (JP)

( * ) Notice: Subject to any disclaimer, the term of this patent is extended or adjusted under 35 U.S.C. 154(b) by 0 days.

(21) Appl. No.: 09/553,066

(22) Filed: Apr. 20, 2000

(30) Foreign Application Priority Data

Apr. 22, 1999 (JP) .......................... 11-114960

(51) Int. Cl.⁷ .......................................... G01N 21/00
(52) U.S. Cl. ..................................... 356/73.1
(58) Field of Search ....................... 356/73.1

(56) References Cited

U.S. PATENT DOCUMENTS

| | | | |
|---|---|---|---|
| 4,984,884 A | 1/1991 | Ryu et al. ................. | 356/73.1 |
| 5,406,368 A * | 4/1995 | Horiuchi et al. ............ | 356/73.1 |
| 5,969,806 A * | 10/1999 | Bergano .................... | 356/73.1 |
| 6,088,088 A * | 7/2000 | Fortenberry ............... | 356/73.1 |
| 6,313,934 B1 * | 11/2001 | Fortenberry ............... | 359/172 |

FOREIGN PATENT DOCUMENTS

JP  7-9386  2/1995

* cited by examiner

Primary Examiner—Frank G. Font
Assistant Examiner—Andrew H. Lee
(74) Attorney, Agent, or Firm—Christie, Parker & Hale, LLP

(57) ABSTRACT

A measuring system of transmission characteristics comprises a reference signal light generator for generating reference signal light of a reference wavelength optically intensity-modulated at a reference frequency, a measuring signal light generator for generating measuring signal light of a measuring wavelength optically intensity-modulated at a measuring frequency synchronizing with the reference frequency, a multiplexer for multiplexing the reference signal light and measuring signal light respectively generated by the reference signal light generator and measuring signal light generator and outputting them onto a to-be-measured optical line, a photodetector for converting the lights propagated on the to-be-measured line into electric signals, a reference frequency extractor for extracting the component of the reference frequency from the output of the photodetector, and a phase detector for detecting a phase of a frequency component corresponding to the measuring frequency contained in the output of the photodetector according to the output of the reference frequency extractor.

13 Claims, 3 Drawing Sheets

MEASURING SYSTEM OF TRANSMISSION CHARACTERISTICS

FIELD OF THE INVENTION

This invention relates to a measuring system of transmission characteristics, and more specifically to a measuring system of transmission characteristics for measuring group delay characteristics (and chromatic dispersion characteristics) of an optical fiber line and optical element.

BACKGROUND OF THE INVENTION

Chromatic dispersion characteristics in an optical fiber transmission line seriously affect transmission characteristics. The chromatic dispersion means a group delay amount per wavelength and thus the chromatic dispersion characteristics can be derived by differentiating group delay characteristics with wavelengths. Accordingly, in general, a system for measuring chromatic dispersion characteristics actually measures the group delay characteristics of each wavelength and then calculates the chromatic dispersion from the obtained result.

The group delay itself can be measured from a difference of propagation time per wavelength. As to a long optical fiber, there are two kinds of measuring methods; one uses an arrival time difference of a single pulse and the other is a phase-shifting method for detecting a phase variation of a periodic signal such as a sine wave. In the phase-shifting method, a reference phase for comparing phases is required, and reference and measuring signals are used. When input and output ends of an optical fiber are disposed at the same place, the reference signal is entered directly to a phase comparator and the measuring signal alone is transmitted on the to-be-measured optical fiber and then input the phase comparator. By sweeping a wavelength of the measuring signal in that state, group delay characteristics (propagation time differences relative to wavelengths) can be measured. On the other hand, when the input and output ends are disposed at different places such as an already installed optical fiber (including an optical amplifying system), the reference signal should be transmitted toward a remote end side.

The system for measuring the chromatic dispersion by transmitting the reference and measuring signals through the to-be-measured fiber is disclosed in Japanese Patent publication Gazette No. Heisei 7-9386 and a specification of U.S. Pat. No. 4,984,884. Naturally, the optical wavelengths of the reference and measuring signals should be different and therefore a wavelength multiplexer for wavelength-multiplexing the reference and measuring signal lights is disposed on the input side of the to-be-measured fiber and a wavelength demultiplexer for wavelength-demultiplexing the reference and measuring signal lights is disposed on the output side of the to-be-measured fiber. The reference and measuring signal lights are modulated by an output from a common oscillator. The reference and measuring signal lights separated by the wavelength demultiplexer are converted into electric signals respectively and then a group delay amount of the measuring signal can be measured by comparing phases of those two electric signals. Also, wavelength characteristics of the group delay, namely chromatic dispersion characteristics can be obtained by sweeping the wavelength of the measuring signal light.

However, since the optical amplifying transmission system has a quite narrow transmission wavelength bandwidth, a wavelength demultiplexer with excellent spectral characteristics is required in order to measure its chromatic dispersion characteristics, and as a result its apparatus becomes expensive. When a spectral wavelength of the wavelength demultiplexer is fixed, wavelength bands allowably to be measured are limited, on the other hand, when the spectral wavelength is variable, the reference and measuring signals are required to follow the varied spectral wavelength causing further increase of the manufacturing cost.

SUMMARY OF THE INVENTION

An object of the present invention is to provide a measuring system of transmission characteristics for measuring group delay or chromatic dispersion characteristics more simply and accurately than ever.

Another object of the present invention is to provide a measuring system of transmission characteristics not requiring any wavelength demultiplexer.

According to the invention, a measuring system of transmission characteristics comprises a reference signal light generator for generating a reference signal light of a reference wavelength $\lambda r$ optically intensity-modulated at a reference frequency fr, a measuring signal light generator for generating a measuring signal light of a measuring wavelength $\lambda s$ optically intensity-modulated at a measuring frequency fs synchronizing the reference frequency fr, a multiplexer for multiplexing the reference signal light and measuring signal light generated respectively by the reference signal light generator and measuring signal light generator and outputting them onto a to-be-measured optical line, a photodetector for converting the lights propagated on the to-be-measured optical line into electric signals, a reference frequency extractor for extracting the component of the reference frequency fr from the output of the photodetector, and a phase detector for detecting a phase of the frequency component corresponding to the measuring frequency fs contained in the output of the photodetector according to the output of the reference frequency extractor.

With this configuration, the transmission characteristics at the measuring wavelength can be measured without demultiplexing the wavelengths of the reference signal light (reference wavelength) and measuring signal light (measuring wavelength). The reference and measuring wavelengths can be closely disposed because it is not necessary to demultiplex the wavelengths.

The phase detector preferably comprises a phase-locked oscillator for generating a signal synchronizing the output of the reference frequency extractor and having a frequency corresponding to the measuring frequency fs, and a detector for detecting, in accordance with the output of the phase-locked oscillator, a phase of a frequency component corresponding to the measuring frequency fs included in the output of the photodetector. The detector preferably comprises a synchronous detector.

When at least one of a signal showing the measuring wavelength $\lambda s$ and a trigger signal showing timing of change for the measuring wavelength $\lambda s$ is transmitted after being superimposed on either of the reference frequency fr and measuring frequency fs, the variation of the measuring wavelength can be detected at a receiving side of the measuring signal light.

Also, the measuring system of transmission characteristics according to the invention comprises an oscillator for oscillating at the measuring frequency fs, a first signal light generator for generating a first signal light of a first wavelength $\lambda a$ optically intensity-modulated at the measuring frequency fs and outputting it onto a first optical line, a first photodetector for receiving the first signal light propagated the first optical line and outputting a signal at a frequency corresponding to the measuring frequency, a second signal light generator for generating a second signal light of a second wavelength λb optically intensity-modulated with the frequency signal from the photodetector and outputting it onto a second optical line, a second photodetector for receiving the second signal light propagated the second optical line, and a phase detector for detecting a phase of the measuring frequency component contained in the output of the second photodetector according to the output of the reference oscillator.

In this configuration, the respective transmission characteristics of the first and second optical lines can be individually measured by controlling the first and second wavelengths. Moreover, the terminal equipment on one side alone is sufficient for the measurement.

BRIEF DESCRIPTION OF THE DRAWING

The above and other objects, features and advantages of the present invention will be apparent from the following detailed description of the preferred embodiments of the invention in conjunction with the accompanying drawings, in which.

DESCRIPTION OF THE PREFERRED EMBODIMENT

Embodiments of the invention are explained below in detail with reference to the drawings.

Figure 1:
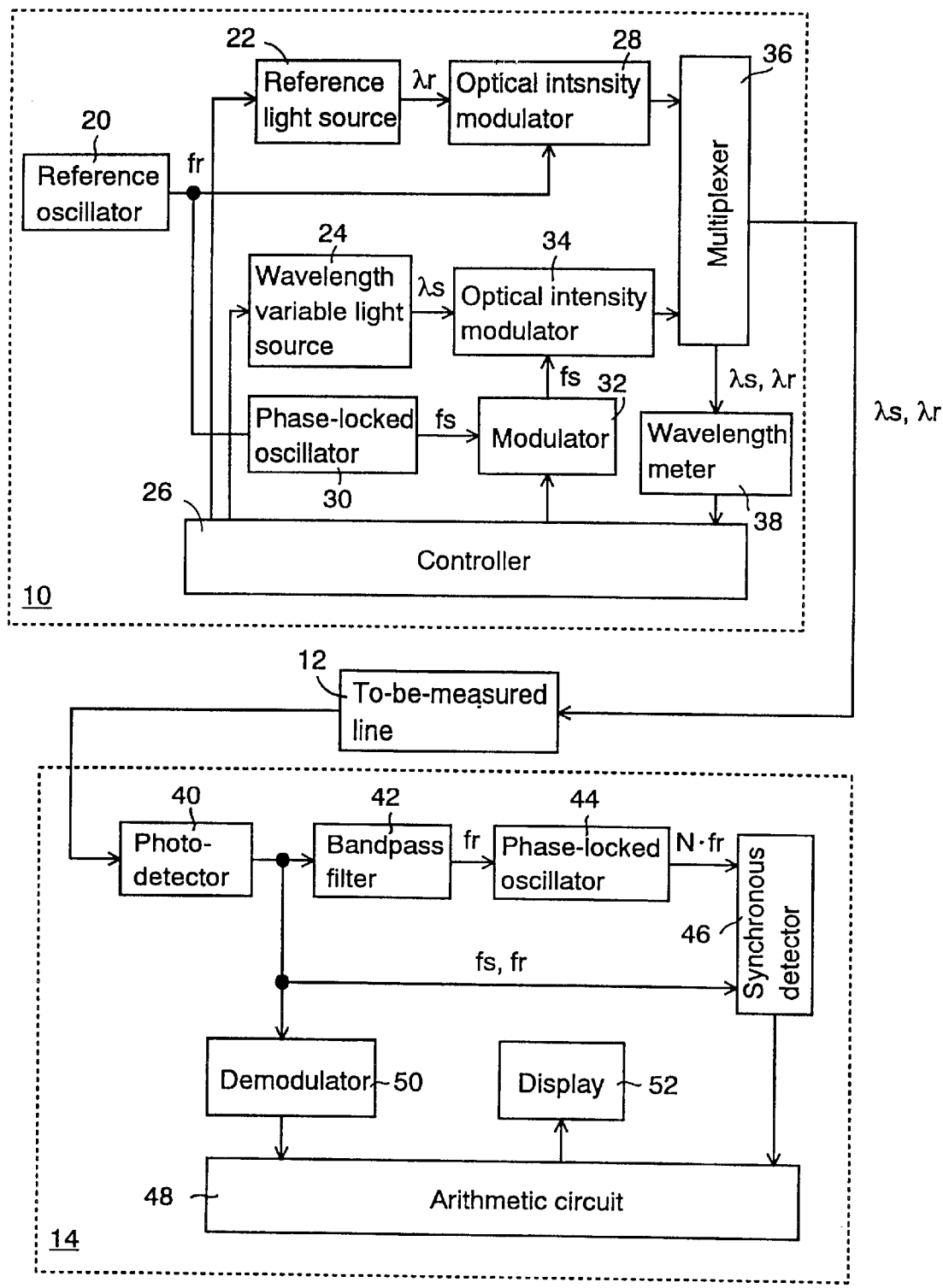
FIG. 1 shows a schematic block diagram according to a first embodiment of the invention.

FIG. 1 is a schematic block diagram according to a first embodiment of the invention. Reference numeral 10 denotes an optical transmitter for outputting reference and measuring signal lights onto a to-be-measured line 12, and reference numeral 14 denotes an optical receiver for receiving the reference and measuring signal lights propagated on the to-be-measured line 12 and measuring a phase difference between the two signal lights.

Figure 2:
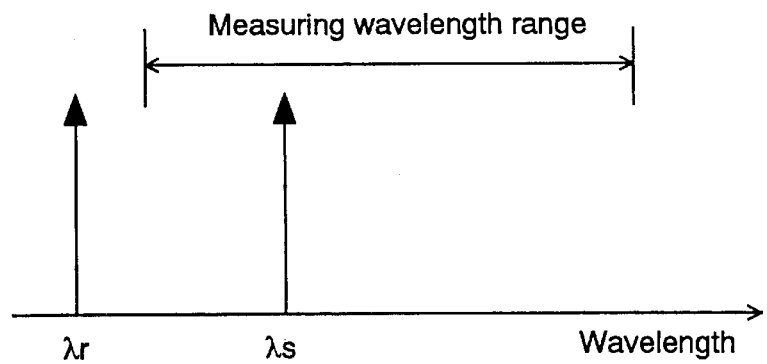
FIG. 2 is a schematic diagram showing the relation between a reference wavelength λr and measuring wavelength λs of the embodiment shown in FIG. 1.

Next explained is the configuration and operation of the optical transmitter 10. A reference oscillator 20 oscillates at a reference frequency fr. A reference light source 22 generates a light of a reference wavelength λr, and a wavelength variable light source 24 generates a light of a measuring wavelength λs. A control circuit 26 stepwisely (or continuously) varies the oscillating wavelength λs of the wavelength variable light source 24. FIG. 2 shows the relation among the reference wavelength λr, measuring wavelength λs and measuring wavelength range. The horizontal axis expresses wavelength. The reference wavelength λr of the reference light source 22 should be constant at least during the measurement. According to the embodiment, although its details are described later, the reference wavelength λr and measuring wavelength λs are not wavelength-demultiplexed at the receiving side, and therefore the two wavelengths can be close to the extent that they do not interfere with each other and this improves the measuring accuracy.

A optical intensity modulator 28 modulates the intensity of output light (wavelength λr) from the reference light source 22 according to the sine wave signal of the frequency fr from the reference oscillator 20.

A phase-locked oscillating circuit 30 generates a measuring frequency fs derived from multiplying the reference frequency from the reference oscillator 20 by N (N>1) and applies it to a modulator 32. Also applied to the modulator 32 is a signal from the control circuit 26 showing a trigger and the like to indicate the wavelength and timing for changing the wavelength of the wavelength variable light source 24. The modulator 32 modulates the amplitude of sine wave signal from the phase-locked oscillating circuit 30 with the signal from the control circuit 26 and applies it to an optical intensity modulator 34. The optical intensity modulator 34 optically modulates the intensity of output light (wavelength λs) from the wavelength variable light source 24 according to the output of the modulator 32.

A multiplexer 36 multiplexes the reference signal light from the optical intensity modulator 28 and the measuring signal light from the optical intensity modulator 34 and applies most of them onto the to-be-measured line 12 and the rest to a wavelength meter 38. The wavelength meter 38 measures the wavelength (reference wavelength λr) of the reference signal light and wavelength (measuring wavelength λs) of the measuring signal light contained in the output light of the multiplexer 36 and informs the control circuit 26 of the measured result. The measuring wavelength λs is used for obtaining the chromatic dispersion from the measured group delay. The control circuit 26 applies information showing the measuring wavelength λs to the modulator 34. By this operation, the information of the measuring wavelength λs is carried to the optical receiver 14 on the measuring signal light. From this point of view, it is better for some cases to dispose a wavelength meter corresponding to the wavelength meter 38 in the optical receiver 14. When the wavelengths of the reference light source 22 and wavelength variable light source 24 are extremely precise, the wavelength meter 38 is not necessary, although it is useful for monitoring the reference wavelength λr and measuring wavelength λs.

If the reference light source 22 can be directly modulated by a signal at the frequency fr, the optical intensity modulator 28 may be omitted. Similarly, if the wavelength variable light source 24 can be modulated by a signal of the frequency fs, the light intensity modulator 34 also may be omitted.

The lights (reference and measuring signal lights) from the multiplexer 36 input and propagate the to-be-measured line 12 and then enters the optical receiver 14.

The configuration and operation of the optical receiver 14 is explained below. The lights (reference and measuring signal lights) propagated the to-be-measured line 12 enter a photodetector 40 and are converted into electric signals. The output of the photodetector 40 comprises the components of the reference frequency fr and measuring frequency fs.

A bandpass filter 42 extracts the reference frequency fr component alone from the output of the photodetector 40 and applies it to a phase-locked oscillating circuit 44. The phase-locked oscillating circuit 44 outputs a sine wave signal at a frequency N×fr (=fs) derived from multiplying the output frequency of the bandpass filter 42 by N. A synchronous detecting circuit 46 synchronously detects the output from the photodetector 40 according to the output of the phase-locked oscillating circuit 44. That is to say, according to the output frequency N×fr (=fs) of the phase-locked oscillating circuit 44, the synchronous detecting circuit 46 extracts the frequency fs component from the output of the photodetector 40 and outputs a signal showing its phase value. By sweeping the measuring wavelength λs, the phase variation due to the group delay characteristics of the to-be-measured line 12 can be measured in relation with the wavelength. The detected result by the synchronous detecting circuit 46 is applied to an arithmetic circuit 48.

A demodulator 50 demodulates the signals (such as the signal indicating the measuring wavelength λs, and trigger signal showing the timing of wavelength change) added at the modulator 32 out of the components at the measuring frequency fs in the output of the photodetector 40 and applies them to the arithmetic circuit 48. The arithmetic circuit 48 is informed the measuring wavelength λs presently used from the output of the demodulator 50. Also, the arithmetic circuit 48 stores each group delay corresponding to a series of measuring wavelengths obtained from the output of the synchronous detecting circuit 46 and the measuring wavelengths obtained from the output of the demodulator 50 in its internal memory and differentiates the respective group delay by the respective wavelength to calculate each chromatic dispersion. The obtained chromatic dispersion characteristics are indicated as a graph on a display 52. Needless to say, the obtained chromatic dispersion characteristics also can be indicated numerically.

A synchronous detector generally can detect signal amplitude as well as the phase of the measuring frequency fs. This amplitude detecting function is equivalent to the function of the demodulator 50. Accordingly, when the synchronous detecting circuit 46 comprises an amplitude detecting output at the measuring frequency fs, the demodulator 50 can be omitted.

By using the synchronous detection for detecting the phase of the measuring frequency fs component, the measurement at a high signal-to-noise power ratio becomes possible, and also it is no longer necessary to dispose a bandpass filter for extracting the measuring frequency fs. This means that the measuring frequency fs can be changed easily.

Figure 3:
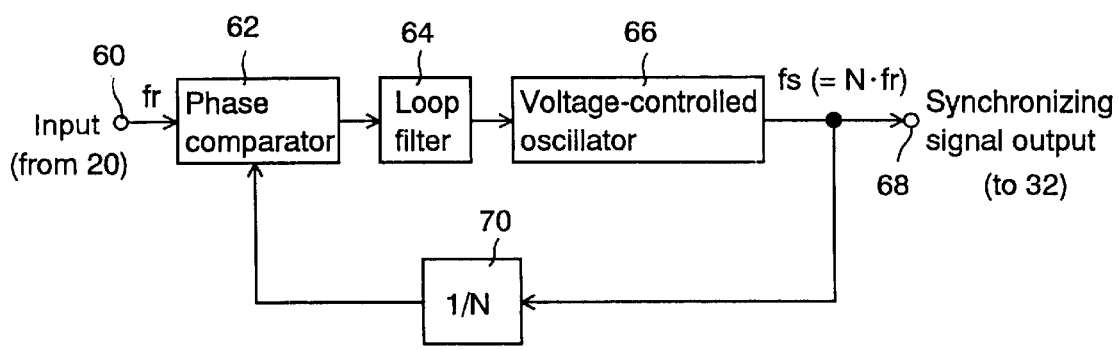
FIG. 3 shows a schematic block diagram of a phase-locked oscillating circuit 30.

FIG. 3 shows a schematic block diagram of the phase-locked oscillating circuit 30. The output of the reference oscillator 20 enters a phase comparator 62 through an input terminal 60. The phase comparator 62 compares the phases between the signal at the reference frequency fr from the input terminal 60 and the result obtained by dividing the output of the oscillating circuit 30 by N and outputs a voltage signal showing the phase difference. The output of the phase comparator 62 is smoothed by a loop filter 64 and applied to the voltage-controlled oscillator 66. The voltage-controlled oscillator 66 oscillates at a frequency according to a voltage value of the voltage signal from the loop filter 64. The output of the voltage-controlled oscillator 66 is applied to the modulator 32 through an output terminal 68 and also to a frequency divider 70. The frequency divider 70 divides the output of the voltage-controlled oscillator 66 by N, and the divided output is applied to the phase comparator 62 as a comparative object with the phase comparator 62. The configuration itself of the phase-locked oscillating circuit 30 is generally known.

Figure 4:
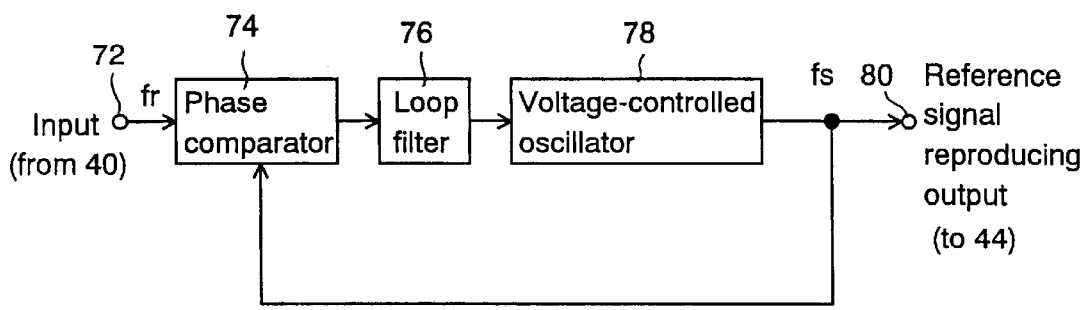
FIG. 4 shows a schematic block diagram of a phase-locked loop circuit as the alternative to a bandpass filter 42.

It is also applicable to employ a phase-locked loop circuit as shown in FIG. 4 instead of the bandpass filter 42. The output of the photodetector 40 inputs a phase comparator 74 through an input terminal 72. The phase comparator 74 compares the phases between the signal from the input terminal 72 and the output signal from this phase-locked loop circuit and outputs a voltage signal showing the phase difference. The output of the phase comparator 74 is smoothed by a loop filter 76 and applied to a voltage-controlled oscillator 78. The voltage-controlled oscillator 78 oscillates at a frequency according to a voltage value of the voltage signal from the loop filter 76, and its output is applied to the phase-locked oscillating circuit 44 through an output terminal 80 and also to the phase comparator 74 as a comparative object with the input signal from the input terminal 72. The frequency of the signal from the voltage-controlled oscillator 78 is equal to that of the input signal of the input terminal 72. By adjusting the voltage-controlled oscillator 78 so as to oscillate within the range of the reference frequency fr, even if the output of the photodetector 40 comprises the measuring frequency fs component, the voltage-controlled oscillator 78 can oscillate synchronizing the reference frequency fr, and therefore the function for extracting the reference frequency fr component alone can be realized.

In this configuration, when the reference frequency fr varies, it is automatically followed. Accordingly, this configuration is convenient if there is some possibility to change the reference frequency fr and also effective for obtaining a good waveform of the reference frequency fr.

When the reference frequency fr is fixed, by employing a temperature-stabilized crystal oscillator as the voltage-controlled oscillator 78, a highly stable reproducing circuit of the reference frequency fr can be realized. The phase-locked oscillator 44 establishes its phase lock by setting the reference frequency fr as a reference and thus often serves as the bandpass filter 42. When the phase-locked oscillator 44 comprises the high frequency selectivity (Q), the bandpass filter 42 can be omitted.

In the embodiment, the reference and measuring signal lights propagate on the same to-be-measured line 12 and so even if the to-be-measured line 12 expands and contracts due to the influence such as surrounding temperature, it affects similarly to both reference and measuring signal lights. Therefore, the influence of the expansion and contraction of the to-be-measured line 12 on both signal lights is offset and does not affect the measured results.

In the above embodiment, the signal showing the wavelength and trigger and the like indicating the timing of the wavelength change of the wavelength variable light source 24 is superimposed on the measuring frequency fs and carried to the optical receiver 14; however, it is also applicable that the signal is superimposed on the reference frequency fr and carried to the optical receiver 14. When the above-described signal is superimposed on the reference frequency fr, however, they are transmitted through amplitude-modulation causing the instability of the output phase of the phase-locked oscillator 44. During a period until the output phase becomes stable, troubles such as disability of measurement are apt to occur. Therefore, it is more preferable to employ the measuring frequency fs.

Figure 5:
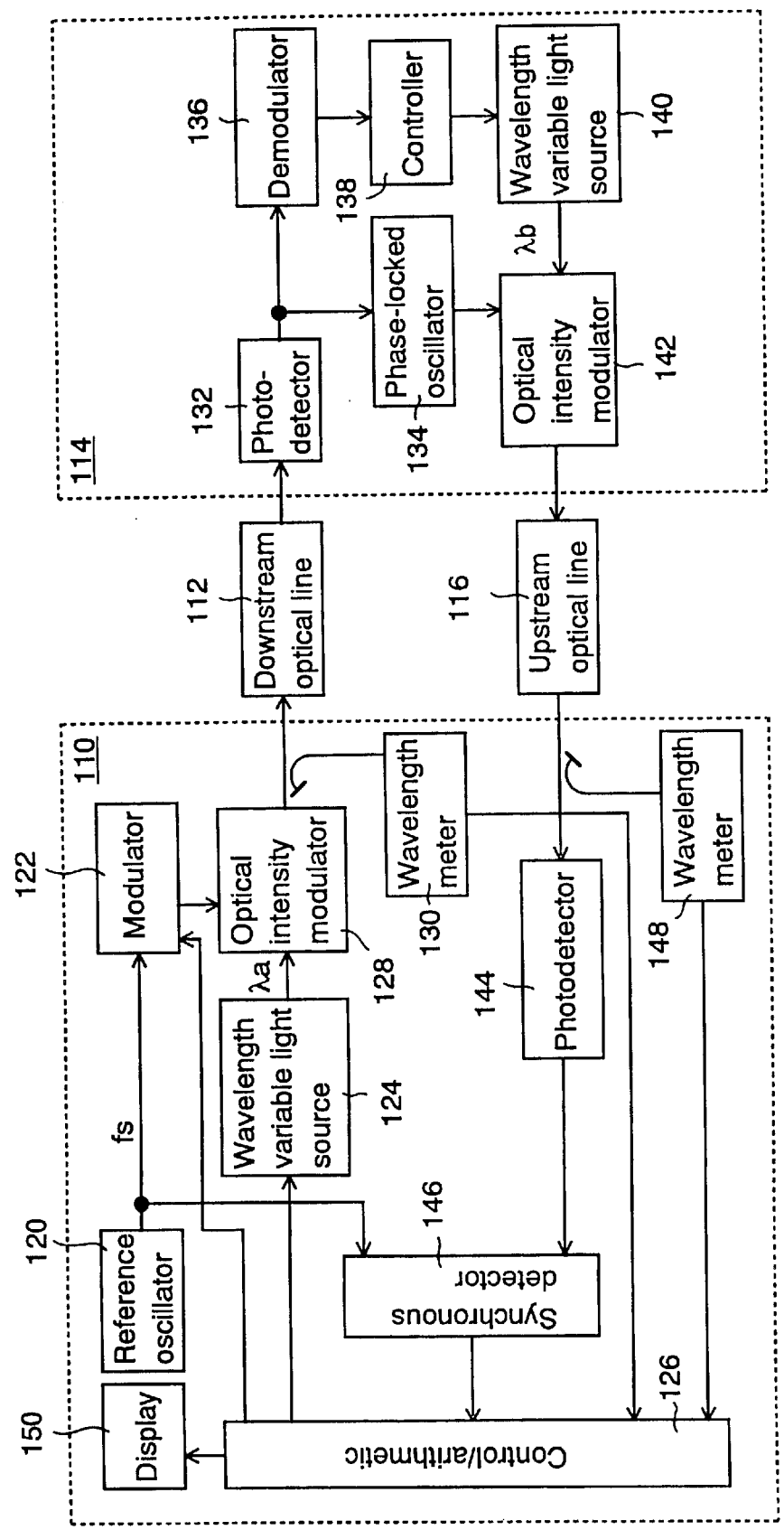
FIG. 5 shows a schematic block diagram according to a second embodiment of the invention.

Next explained is an embodiment of a measuring system for individually measuring group delay characteristics, namely chromatic dispersion characteristics of upstream and downstream optical lines at one terminal station. FIG. 5 shows a schematic diagram of the embodiment.

A measuring terminal equipment 110 outputs a measuring signal light of wavelength λa toward a downstream optical line 112. The measuring signal light, although its details are described later, is intensity-modulated at a predetermined measuring frequency fs for group delay measurement. The measuring signal light of wavelength λa propagates the downstream optical line 112 and enters a turnaround terminal equipment 114. The turnaround terminal equipment 114 converts the measuring signal light input from the downstream optical line 12 into an electric signal and outputs the measuring signal light of wavelength λb intensity-modulated at the same measuring frequency fs toward an upstream optical line 116. The measuring signal light of wavelength λb propagates on the upstream optical line 116 and enters the measuring terminal equipment 110.

The downstream optical line 112 and upstream optical line 116 generally comprise optical fibers and optical amplifiers, however it is also applicable to comprise repeaterless optical transmission lines composed of optical fibers alone.

The wavelength λa of the measuring signal light output from the measuring terminal equipment 110 onto the downstream optical line 112 and the wavelength λb of the measuring signal light output from the turnaround terminal equipment 114 onto the upstream optical line 116 are changed into a measuring wavelength λs or reference wavelength λr according to which group delay of the downstream optical line 112 or the upstream optical line 116 is measured. The details of the above configuration are explained later.

The operation of the embodiment is described next. In the measuring terminal equipment 110, a reference oscillator 120 oscillates at the measuring frequency fs used for measuring group delay and applies a tone signal of the measuring frequency fs to a modulator 122. A wavelength variable light source 124 can vary the laser oscillating wavelength within the reference wavelength range shown in FIG. 2, and a control/arithmetic circuit 126 controls the oscillating wavelength λa. The control/arithmetic circuit 126 supplies a signal for specifying the wavelength λb of the measuring signal light to be output from the turnaround terminal equipment 114 onto the upstream optical line 116. The modulator 122 modulates the amplitude of tone signal from the reference oscillator 120 with the signal from the control/arithmetic circuit 126 and applies it to a optical intensity modulator 128. The optical intensity modulator 128 optically modulates the intensity of output light (wavelength λa) from the wavelength variable light source 124 according to the output of the modulator 122.

Most of the output light (measuring signal light) of the optical intensity modulator 128 is applied to the downstream optical line 112 while a potion of it is applied to a wavelength meter 130. The wavelength meter 130 measures the wavelength of the output light from the optical intensity modulator 128 and applies the measured result to the control/arithmetic circuit 126. When the wavelength of the wavelength variable light source 124 is sufficiently precise, the wavelength meter 130 can be omitted, although it is useful for monitoring the wavelength variable light source 124.

A photodetector 132 in the turnaround terminal equipment 114 converts the reference signal light (wavelength λa) propagated on the downstream optical line 112 into an electric signal. The output of the photodetector 132 is applied to a phase-locked oscillating circuit 134 and a demodulating circuit 136. The phase-locked oscillating circuit 134 has the same configuration with the phase-locked oscillating circuit 44 and generates a tone signal of the frequency fs phase-locked with the input measuring frequency fs. The demodulating circuit 136 amplitude-demodulates the output of the photodetector 132 and supplies the demodulated result to a control circuit 138. The output signal of the demodulating circuit 136 is the one to be supplied from the control/arithmetic circuit 126 to the modulator 122. The control circuit 138 controls an oscillating wavelength λb of a wavelength variable light source 140 according to the output of the demodulating circuit 136. That is, the wavelength variable light source 140 laser-oscillates at the wavelength λb specified by the control circuit 138. An optical intensity modulator 142 optically modulates the intensity of output light (wavelength λb) of the wavelength variable light source 140 according to the output of the phase-locked oscillating circuit 134. The output light of the optical intensity modulator 142 is sent to the upstream optical line 116, propagates on it and enters the measuring terminal equipment 110.

A photodetector 144 of the measuring terminal equipment 110 converts the input measuring signal light (wavelength λb) from the upstream optical line 116 into an electric signal and supplies it to a synchronous detecting circuit 146. Also, the output (frequency fs) of the reference oscillator 120 is supplied to the synchronous detecting circuit 146. The synchronous detecting circuit 146 synchronously detects the output of the photodetector 144 according to the output of the reference oscillator 120 and supplies the detected result to the control/arithmetic circuit 126.

A wavelength meter 148 measures the wavelength λb of the input measuring signal light from the upstream light line 116 and applies the measured result to the control/arithmetic circuit 126. When the wavelength of the wavelength variable light source 140 is sufficiently precise, the wavelength meter 148 can be omitted, although it is useful for monitoring the wavelength variable light source 140.

The control/arithmetic circuit 126 stores each group delay corresponding to a series of measuring wavelengths obtained from the output of the synchronous detecting circuit 146 in its internal memory and differentiates the respective group delay by the respective wavelength to calculate each chromatic dispersion. The obtained chromatic dispersion characteristics are indicated as a graph on a screen of a display 150. Needless to say, the chromatic dispersion characteristics also can be output numerically.

When group delay of the downstream optical line 112 is measured, the oscillating wavelength λa of the wavelength variable light source 124 is assigned to become a measuring wavelength λs to be swept within a measuring wavelength range and the oscillating wavelength λb of the wavelength variable light source 140 in the turnaround terminal equipment 114 is assigned to become a constant reference wavelength λr. Also, in this embodiment, the reference wavelength λr can be a wavelength within the measuring wavelength range. In the embodiment, the reference wavelength λr is used only for transmitting the phase information of the measuring frequency fs from the turnaround terminal equipment 114 to the measuring terminal equipment 110.

The detected result by the synchronous detecting circuit 146 generally shows a sum value of the group delay of the measuring frequency fs at the wavelength λa in the downstream optical line 112 and that of the measuring frequency fs at the constant wavelength λb in the upstream optical line 116. However, when the wavelength λa of the measuring signal light propagating on the downstream optical line 112 is swept within the measuring wavelength range and the wavelength λb of the measuring signal light propagating on the upstream optical line 116 is set to the constant reference wavelength λr, the group delay in the upstream optical line 116 becomes constant regardless of the measuring wavelength λs. The control/arithmetic circuit 126 can extract only the group delay amount of the downstream optical line 112 occurred when the wavelength λa of the wavelength variable light source 124 is varied within the measuring wavelength range and therefore can calculate the chromatic dispersion characteristics of the downstream optical line 112. The calculated result is displayed on a screen of a display unit 150. Similarly to the first embodiment, it is obvious that the control/arithmetic circuit 126 also can output the obtained wavelength characteristics as numeric data.

Conversely, when group delay of the upstream optical line 116 is measured, the oscillating wavelength λb of the wavelength variable light source 140 in the turnaround terminal equipment 114 is assigned to become a measuring wavelength λs to be swept within the measuring wavelength range and the oscillating wavelength λa of the wavelength variable light source 124 in the measuring terminal equipment 110 is assigned to become a constant reference wavelength λr. In this example, the reference wavelength λr is used only for transmitting phase information of the measuring frequency fs from the measuring terminal equipment 110 to the turnaround terminal equipment 114. Compared to a configuration in which an oscillator of the measuring frequency fs is disposed in the turnaround terminal equipment 114, this configuration has the advantage of selecting the measuring frequency fs freely at the measuring terminal equipment 110 because of utilizing the reference oscillator 120 in the measuring terminal equipment 110.

When the wavelength λb of the measuring signal light propagating on the upstream optical line 116 is swept within the measuring wavelength range and the wavelength λa of the measuring signal light propagating on the downstream optical line 112 turns to the constant reference wavelength λr, the group delay of the downstream optical line 112 becomes constant regardless of the measuring wavelength λs. The control/arithmetic circuit 126 can extract only the group delay amount of the upstream optical line 116 occurred when the wavelength λb of the wavelength variable light source 140 is varied within the measuring wavelength range through the modulator 122, demodulator 136 and control circuit 138, and therefore can calculate the chromatic dispersion characteristics of the upstream optical line 116. The calculated result is displayed on a screen of the display unit 150. Similarly to the first embodiment, it is obvious that the control/arithmetic circuit 126 also can output the obtained wavelength characteristics as numeric data.

In the embodiment shown in FIG. 5, although the light source 124 in the measuring terminal equipment 110 and the light source 140 in the turnaround terminal equipment 114 are both wavelength-variable, either of them can be a wavelength-fixed light source. When the light source 140 in the turnaround terminal equipment 114 is wavelength-fixed, for instance, the group delay and chromatic dispersion of the downstream optical line 112 alone can be measured. Conversely, when the light source 124 in the measuring terminal equipment is wavelength-fixed and the light source 140 in the turnaround terminal equipment 114 is wavelength-variable, the group delay and chromatic dispersion of the upstream optical line 116 alone can be measured.

In the above embodiment, to make it simple to understand, the optical intensity modulator is disposed separately from the light source. It is obvious, however, that the light source can be optically intensity-modulated directly at the measuring frequency fs or reference frequency fr.

The signals of the reference frequency fr and measuring frequency fs are generally sine wave signals. In this invention, however, those signals can be alternate signals (e.g. rectangular wave signals) having respective frequency components since their only function is to carry the frequencies.

As easily understandable from the above description, according to the invention, group delay characteristics, namely chromatic dispersion characteristics of an optical line can be measured with a simple configuration. Furthermore, since a receiving apparatus does not need to demultiplex reference wavelength light and measuring wavelength light, a wavelength close to a measuring wavelength can be used as a reference wavelength.

Also, as signal light is transmitted downstream and upstream optical lines in a loop configuration and its wavelength is set to become a reference wavelength or a measuring wavelength on each line, each group delay of the downstream and upstream optical lines can be measured separately. That is, chromatic dispersion characteristics of both upstream and downstream optical lines can be measured individually from one terminal equipment.

While the invention has been described with reference to the specific embodiment, it will be apparent to those skilled in the art that various changes and modifications can be made to the specific embodiment without departing from the spirit and scope of the invention as defined in the claims.

What is claimed is:

1. A measuring system of transmission characteristics, comprising:

a reference signal light generator to generate reference signal light having a reference wavelength optically intensity-modulated at a reference frequency;

a measuring signal light generator to generate measuring signal light having a measuring wavelength optically intensity-modulated at a measuring frequency and synchronized with the reference frequency;

a multiplexer to multiplex the reference signal light and the measuring signal light and to output the multiplexed lights onto an optical line;

a photodetector to convert the multiplexed lights propagating on the optical line into electric signals;

a reference frequency extractor to extract the reference frequency from the electric signals output from the photodetector; and a phase detector to detect a phase of the measuring frequency contained in the electric signals output from the photodetector according to the extracted reference frequency.

2. The measuring system of transmission characteristics of claim 1 wherein the phase detector comprises a phase-locked oscillator to generate a signal synchronized to the extracted reference frequency and having a frequency corresponding to the measuring frequency, and a detector to detect the phase of the measuring frequency contained in the electric signals output from the photodetector according to the synchronized signal output from the phase-locked oscillator.

3. The measuring system of transmission characteristics of claim 2 wherein the detector comprises a synchronous detector.

4. The measuring system of transmission characteristics of claim 1 wherein in the measuring signal light generator comprises a wavelength variable light source having a variable oscillating wavelength.

5. The measuring system of transmission characteristics of claim 1 wherein the measuring signal light generator comprises a phase-locked oscillator to generate a signal having the measuring frequency from the reference frequency, a wavelength variable light source having a variable oscillating wavelength, and an optical intensity modulator to optically modulate an intensity of the signal generated by the phase-locked oscillator.

6. The measuring system of transmission characteristics of claim 1 wherein the reference signal light generator comprises a reference oscillator oscillating at the reference frequency, a reference light source laser-oscillating at the reference wavelength, and an optical intensity modulator to optically modulate an intensity of output light of the reference light source with an output of the reference oscillator.

7. The measuring system of transmission characteristics of claim 1 further comprising a signal superimposer to superimpose at least one of a signal having information relating to the measuring wavelength and a trigger signal having information related to timing of its wavelength change of either the reference frequency or measuring frequency, a demodulator to demodulate the superimposed signal from the electric signals output from the photodetector, and an arithmetic unit to calculate chromatic dispersion characteristics from outputs of the demodulator and the detector.

8. The measuring system of transmission characteristics of claim 1 further comprising a wavelength meter to measure at least one of wavelengths of the reference signal light and measuring signal light.

9. A measuring system of transmission characteristics, comprising:

an oscillator having an output with a measuring frequency;

a first signal light generator to generate a first signal light having a first wavelength optically intensity-modulated at the measuring frequency and to output it onto a first optical line;

a first photodetector to receive the first signal light propagated on the first optical line and to output a signal at a frequency corresponding to the measuring frequency;

a second signal light generator to generate a second signal light having a second wavelength optically intensity-modulated with the signal from the photodetector and to output it onto a second optical line;

a second photodetector for receiving the second signal light propagated on the second optical line; and a phase detector to detect a phase of the measuring frequency component contained in an output of the second photodetector according to the output of the oscillator.

10. The measuring system of transmission characteristics of claim 9 wherein the phase detector comprises a synchronous detector.

11. The measuring system of transmission characteristics of claim 9 wherein at least one of the first wavelength and second wavelength is variable.

12. The measuring system of transmission characteristics of claim 9 further comprising a first controller to control the first wavelength and a second controller to control the second wavelength.

13. The measuring system of transmission characteristics of claim 12 further comprising a signal superimposer to superimpose a wavelength control signal assigning the second wavelength $\lambda b$ on the output of the oscillator and to supply it to the first signal light generators and a demodulator to demodulate the wavelength control signal from the signal from the first photodetector and supply it to the second controller.

* * * * *